(12) United States Patent
Wu et al.

(10) Patent No.: US 7,839,959 B2
(45) Date of Patent: Nov. 23, 2010

(54) JOINT SPACE-TIME OPTIMUM FILTERS (JSTOF) FOR INTERFERENCE CANCELLATION

(75) Inventors: Huan Wu, Kanata (CA); Sean Simmons, Waterloo (CA); Zoltan Kemenczy, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/786,746

(22) Filed: May 25, 2010

(65) Prior Publication Data

US 2010/0232556 A1    Sep. 16, 2010

Related U.S. Application Data

(63) Continuation of application No. 11/420,254, filed on May 25, 2006, now Pat. No. 7,733,996.

(60) Provisional application No. 60/684,312, filed on May 25, 2005, provisional application No. 60/708,236, filed on Aug. 15, 2005.

(51) Int. Cl.
*H04B 1/10* (2006.01)
*H04L 27/06* (2006.01)

(52) U.S. Cl. ..................... 375/350; 375/343

(58) Field of Classification Search .............. 375/316, 375/347, 346, 285, 350, 267, 229–234, 343, 375/130, 140, 144, 147, 143, 152; 455/132, 455/137

See application file for complete search history.

(56) References Cited

U.S. PATENT DOCUMENTS

| | | | |
|---|---|---|---|
| 5,349,607 A | 9/1994 | Moreno | 375/94 |
| 5,493,307 A | 2/1996 | Tsujimoto | 342/380 |
| 5,821,988 A | 10/1998 | Citta et al. | 348/21 |
| 6,154,443 A | 11/2000 | Huang et al. | 370/210 |

(Continued)

FOREIGN PATENT DOCUMENTS

DE    4201439    7/1993

(Continued)

OTHER PUBLICATIONS

Dohler, et al., "Higher Order Space-Time Block Codes for Virtual Antenna Arrays", 10th International Conference, Telecommunications, 2003. ICT 2003, Digital Object Identifier: 10.1109/ICTEL. 203.1191212, IEEE 0-7803-7661-07/2003, pp. 198-203.

(Continued)

*Primary Examiner*—Tesfaldet Bocure
(74) *Attorney, Agent, or Firm*—Allen, Dyer, Doppelt, Milbrath & Gilchrist, P.A.

(57) ABSTRACT

A filter for reducing co-channel interference within a communications receiver may include a multi-channel, space-time filter circuit that filters n signal parts that have been split from a communications signal by jointly estimating space-time filter weights and multi-channel impulse responses (CIRs). The filter may further include a multi-channel, matched filter circuit that receives multi-channel signals from the multi-channel, space-time filter circuit and has a filter response that is provided by a channel impulse response estimation from the space-time filter circuit.

28 Claims, 10 Drawing Sheets

U.S. PATENT DOCUMENTS

| | | | |
|---|---|---|---|
| 6,314,147 B1 | 11/2001 | Liang et al. | 375/346 |
| 6,650,716 B1 | 11/2003 | Ratnarajah | 375/347 |
| 6,724,809 B2 | 4/2004 | Reznik | 375/148 |
| 6,775,260 B1 | 8/2004 | Dabak et al. | 370/342 |
| 6,952,460 B1 | 10/2005 | Van Wechel et al. | 375/350 |
| 2003/0063596 A1 | 4/2003 | Arslan et al. | 370/347 |
| 2004/0141565 A1 | 7/2004 | Kwak et al. | 375/267 |
| 2005/0047515 A1 | 3/2005 | Walton et al. | 375/267 |
| 2005/0250466 A1 | 11/2005 | Varma et al. | 455/296 |
| 2007/0142089 A1 | 6/2007 | Roy | 455/562.1 |

FOREIGN PATENT DOCUMENTS

| | | |
|---|---|---|
| EP | 1404046 | 3/2004 |
| WO | 2004/019447 | 3/2004 |
| WO | 2005/011047 | 2/2005 |

OTHER PUBLICATIONS

Kohno, "Spatial and Temporal Communication Theory Using Adaptive Antenna Array", IEEE Personal Communications, IEEE Communications Society, US, vol. 5, No. 1, Feb. 1998, XP000737860, ISSN: 1070-9916, pp. 28-35.

Liang et al., "A Two-Stage Hybrid Approach for CCI/ISI Reduction with Space-Time Processing", IEEE Communications Letters, vol. 1, No. 6, Nov. 1997, pp. 163-165.

Pipon et al., "Multichannel Receivers Performance Comparison in the Presence of ISI and CCI", Thomson-CSF Communications, IEEE Digital Signal Processing Proceedings, 1997. DSP 97, 1997 13th International Conference on Publication Date: Jul. 1997, vol. 1, pp. 371-374.

Samanta, "Joint Co-channel Interference Cancellation and Channel Shortening with Space-Time Processing", Wireless Systems Innovations Laboratory, University of Texas at Austin, Spring 2003, pp. 1-9.

Spagnolini, "Adaptive Rank-One Receiver for GSM/DCS Systems", IEEE Transactions on Vehicular Technology, vol. 51, No. 5, Sep. 2002, pp. 1264-1271.

| Cholesky and EVD in Covariance Domain | QR and EVD in Sample and Covariance Domain | SVD in Sample Domain |
|---|---|---|
| 1. $R_s = \overline{S}\overline{S}^T$ (6×21) (21×6) <br> $R_s = L_s L_s^T$ (6×6) | $R_s = \overline{S}\overline{S}^T$ (6×21) (21×6) <br> $R_s = L_s L_s^T$ (6×6) | $R_s = \overline{S}\overline{S}^T$ (6×21) (21×6) <br> $R_s = L_s L_s^T$ (6×6) |
| 2. $R_x = \overline{X}\overline{X}^T$ (8×21) (21×8) <br> $R_{xs} = \overline{X}\overline{S}^T$ (8×21) (21×6) <br> $R_x = L_x L_x^T$ (8×8) (8×8) | $\overline{X}^T = QR$ (21×8) (8×8) | $\overline{X}^T = U_x \Sigma_x V_x^T$ (21×8) <br> (8×8) (8×8) <br> $\Sigma_x = diag(\sigma_1, \cdots, \sigma_8)$ <br> (8×8) |
| 3. $D = L_s^{-T} R_{xs}^T R_x^{-1} R_{xs} L_s^{-1}$ (6×6) <br> $= D_1 D_1^T$ (6×8) (8×6) <br> $D_1 = L_s^{-T} R_{xs}^T L_x^{-T} = R_1^T L_x^{-T}$ <br> (6×8)= (6×8) (8×8) <br> $R_1 = R_{xs} L_s^{-1}$ (8×6) | $D = D_1 D_1^T$ (6×6) <br> $D_1 = L_s^{-T} \overline{S} Q$ <br> (6×8)= (6×6) (6×21) (21×8) | $D = D_1 D_1^T$ (6×6) <br> $D_1 = L_s^{-T} \overline{S} U_x$ <br> (6×8)= (6×6) (6×21) (21×8) |
| 4. $D = V_D \Lambda_D V_D^T$ <br> (6×6) (6×6) (6×6) <br> $V_{D4} = V_D(:, 1:4)$ (6×4) | $D = V_D \Lambda_D V_D^T$ <br> (6×6) (6×6) (6×6) <br> $V_{D4} = V_D(:, 1:4)$ (6×4) | $D_1^T = U_D \Sigma_D V_D^T$ <br> (8×6) (6×6) (6×6) <br> $V_{D4} = V_D(:, 1:4)$ (6×4) |
| 5. $\hat{H}_t = L_s^{-1} V_{D4}$ (6×4) <br> $\hat{H}_s = R_{xs} \hat{H}_t$ (8×4) <br> $\hat{H} = \hat{H}_s \hat{H}_t^T = R_1 V_{D4} V_{D4}^T L_s^{-T}$ <br> $= R_{1v} L_s^{-T}$ <br> (8×6) =(8×6) (6×6) <br> $R_{1v} = R_1 V_{D4} V_{D4}^T$ <br> (8×6) = (8×6) (6×4) (4×6) | $\hat{H}_t = L_s^{-1} V_{D4}$ (6×4) <br> $\hat{H}_s = R_{xs} \hat{H}_t = R^T D_1^T V_{D4}$ <br> (8×4) <br> $\hat{H} = R_{1v} L_s^{-T}$ (8×6) =(8×6) (6×6) <br> $R_{1v} = R^T D_1^T V_{D4} V_{D4}^T$ <br> (8×6) = (8×8) (8×6) (6×4) (4×6) | $\hat{H}_t = L_s^{-1} V_{D4}$ (6×4) <br> $\hat{H}_s = \overline{X}\overline{S}^T L_s^{-1} V_{D4}$ (8×4) <br> $H = \overline{X}\overline{S}^T L_s^{-1} V_{D4} V_{D4}^T L_s^{-T}$ <br> (8×6) = (8×21) (21×6) (6×4) <br> (4×6) (6×6) |
| 6. $w_{opt} = R_x^{-1} R_{xs} \hat{H}_t$ (8×4) <br> $= L_x^{-T} D_v$ <br> (8×8) (8×4)= (8×4) <br> $D_v = D_1^T V_{D4}$ <br> (8×6) (6×4)= (8×4) | $w_{opt} = R_x^{-1} R_{xs} \hat{H}_t$ (8×4) <br> $= R^{-1} D_v$ (8×8) (8×4)= (8×4) <br> $D_v = D_1^T V_{D4}$ <br> (8×6) (6×4)= (8×4) | $w_{opt} = V_x \Sigma_x^{-1} U_x^T \overline{S}^T L_s^{-1} V_{D4}$ <br> $= V_x \Sigma_x^{-1} D_1^T V_{D4}$ <br> (8×8)(8×8)(8×6) (6×4) <br> $\Sigma_x^{-1} = diag(1/\sigma_1, \cdots, 1/\sigma_8)$ <br> (8×8) |
| 7. $h_{opt} = w_{opt}^T \hat{H}$ (4×6) | $h_{opt} = w_{opt}^T \hat{H}$ (4×6) | $h_{opt} = w_{opt}^T \hat{H}$ (4×6) |

FIG. 9 ical Application Nos. 60/684,312, filed May 25, 2005, and 60/708,236, filed Aug. 15, 2005, all of which are hereby incorporated herein in their entirety by reference.
JOINT SPACE-TIME OPTIMUM FILTERS (JSTOF) FOR INTERFERENCE CANCELLATION

CROSS-REFERENCE TO RELATED APPLICATIONS

This application is a continuation of Ser. No. 11/420,254 filed May 25, 2006, now issued as U.S. Pat. No. 7,733,996 on Jun. 5, 2010 which claims the benefit of U.S. Provisional Application Nos. 60/684,312, filed May 25, 2005, and 60/708,236, filed Aug. 15, 2005, all of which are hereby incorporated herein in their entirety by reference.

FIELD OF THE INVENTION

The present invention relates to wireless communications systems, such as cellular communications systems, and, more particularly, to filtering received wireless signals to reduce unwanted interference.

BACKGROUND OF THE INVENTION

Interference canceling matched filters (ICMF) and joint demodulation (JDM) has been investigated to meet requirements for a Downlink Advanced Receiver Performance (DARP) that is standardized by the third generation mobile communications system and the Third Generation Partnership Project (3GPP). Some of these proposals are set forth in the following articles and documents.
1. Liang et al., A Two-Stage Hybrid Approach for CCI/ISI Reduction with Space-Time Processing, IEEE Communication Letter Vol. 1, No, 6, November 1997.
2. Pipon et al., Multichannel Receives Performance Comparison In the Presence of ISI and CCI, 1997 13th Intl. Conf. on Digital Signal Processing, July 1997.
3. Spagnolini, Adaptive Rank-One Receiver for GSM/DCS Systems, IEEE Trans. on Vehicular Technology, Vol. 51, No. 5, September 2002.
4. Feasibility Study on Single Antenna Interference Cancellation (SAIC) for GSM Networks, 3GPP TR 45.903 Version 6.0.1, Release 6, European Telecommunications Standards Institute, 2004.
5. Radio Transmission and Reception (Release 6), 3GPP TS 45.005 Version 6.8.0; European Telecommunications Standards Institute, 2005.
6. Stoica et al., Maximum Likelihood Parameter and Rank Estimation in Reduced-Rank Multivariate Linear Regressions, IEEE Trans. On Signal Processing, Vol. 44, No. 12, December 1996.
7. Kristensson et al., Blind Subspace Identification of a BPSK Communication Channel, Proc. 30$^{th}$ Asilomar Conf. On Signals, Systems and Computers, 1996.
8. Golub et al., Matrix Computations, 3$^{rd}$ Edition, 1996.
9. Trefethen et al., Numerical Linear Algebra, 1997.
10. Press at al., Numerical Recipes in C, 2$^{nd}$ Edition, 1992.

Current Global System for Mobile communications (GSM) cellular systems have to address the co-channel interference (CCI) on the mobile station (MS) side, as well as address the DARP requirements. Some single channel structures and pre-filters have been used to aid in canceling the interference and provide some channel impulse response (CIR) estimation. Moreover, some systems have used maximization of the signal-to-interference to design jointly a single channel space-time filter and the CIR estimation for a single channel. Other systems have used a constrained minimization of the mean-square error to design a single channel space filter. Other systems have used a single channel space filter that is designed by a rank-one approximation of the ML channel estimation. The target applications for these systems have been a base station where a physical antenna array including a plurality of antennas is available.

BRIEF DESCRIPTION OF THE DRAWINGS

Various objects, features and advantages will become apparent from the following detailed description when considered in light of the accompanying drawings, in which:

FIG. 9 is a table comparing the three approaches for performing Cholesky, QR, and SVD computations in accordance with the present invention.

DETAILED DESCRIPTION OF THE PREFERRED EMBODIMENTS

Several non-limiting embodiments will now be described more fully hereinafter with reference to the accompanying drawings, in which preferred embodiments are shown. These embodiments may, however, be embodied in many different forms and should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

In accordance with one embodiment, Co-Channel Interference (CCI) on a mobile station (MS) side in a current Global System for Mobile (GSM) communications system is addressed, as well as the compliant requirement of a Downlink Advanced Receiver Performance (DARP) standard by the Third Generation Partnership Project (3GPP).

The invention may generally be summarized as follows. A filter reduces co-channel interference within a communications receiver and may include a multi-channel, space-time filter circuit that filters signal parts that have been split from a communications signal by jointly estimating space-time filter weights and multi-channel impulse responses (CIRs). A multi-channel matched filter circuit may receive multi-channel signals from the multi-channel, space-time filter circuit and have a filter response that is provided by a channel impulse response estimation from the space-time filter circuit. An alternative filter may be operative when an interference level is below a pre-determined threshold and may be formed as a matched filter and cross-correlation circuit and switch mechanism for switching the signal parts into the matched filter and cross-correlation circuit.

In one aspect, the multi-channel, space-time filter circuit may include a plurality of multiplier and delay circuits that each receive n signal parts. The multiplier and delay circuits may be operative based on space-time filter weights. More particularly, two multiplier circuits connected in parallel and a delay circuit connected to the input of one of the multiplier circuits may be used for each signal part. Each multiplier and delay circuit may have about a one symbol delay. A joint optimal filter weights and channel estimator may be operatively connected to the multi-channel, space-time filter circuit and receive training sequence (TS) symbols and timing uncertainty data and generate space-time filter weights for the multi-channel, space-time filter circuit. A summer circuit may sum data from the multiplier and delay circuits for each channel. An equalizer circuit may be operative with the multi-channel, matched filter circuit.

Figure 1:
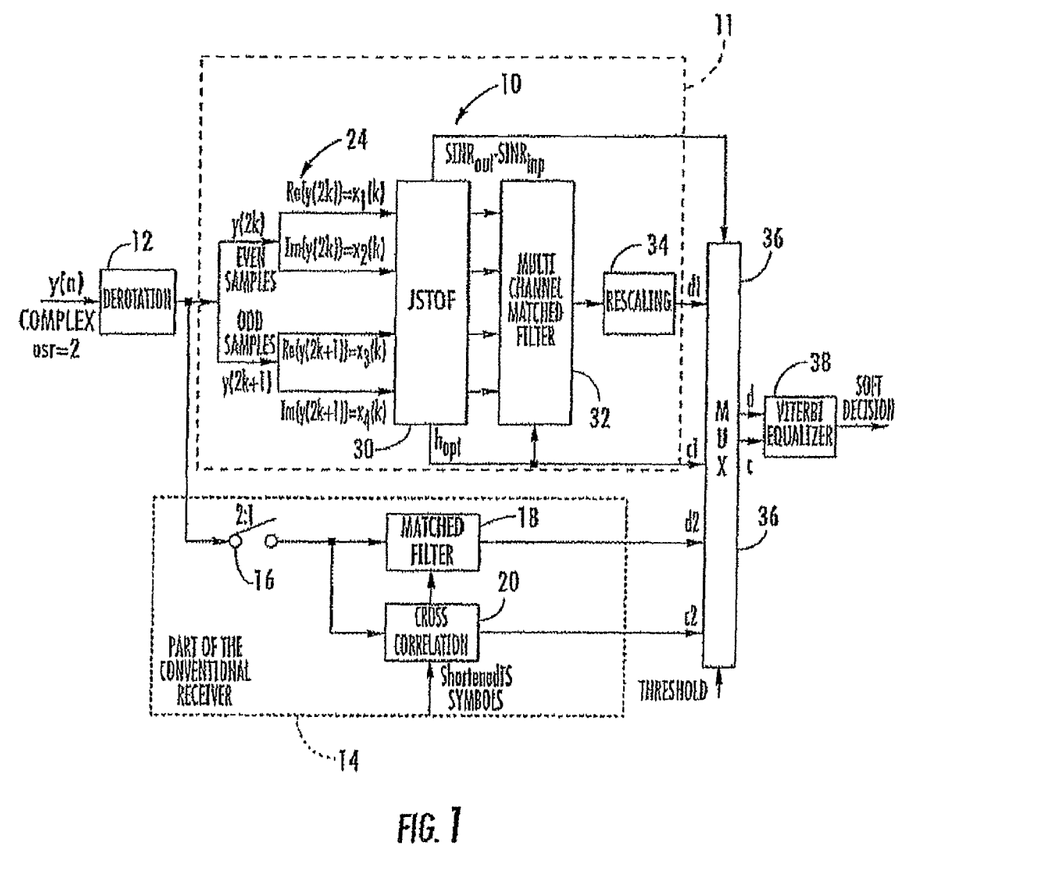
FIG. 1 is a block diagram of a Joint Space-Time Optimum Filter based Downlink Advanced Receiver Performance (DARP) capable receiver in accordance with an embodiment of the invention.

The illustrated embodiment in FIG. 1 provides a multi-channel pre-filter that is operable for canceling interference and providing channel impulse response (CIR) estimation adaptively and optimally. The pre-filter can use two major components in one non-limiting example: (1) a multiple-input-multiple-output (MIMO) based Joint Space-Time Optimum Filter (JSTOF); and (2) a multiple-input-single-output (MISO) based multi-channel matched filter. In a typical mobile station using a single available antenna, a virtual antenna array can be configured internally by the combination of over sampling and the separation of real and imaginary parts that receive samples, as will be appreciated by those skilled in the art.

In one non-limiting embodiment, a signal from the virtual antenna array is fed to the JSTOF, where the optimum weights for the MIMO-based interference canceling filter are estimated. At the same time, the multi-channel CIRs for the desired signal are jointly estimated. The output of the JSTOF allows the interference to be filtered and fed to a MISO-based multi-channel matched filter. The filter response of the matched filter is provided by the CIR estimation from the JSTOF.

The output of the multi-channel matched filter passes to a Viterbi equalizer which removes the inter-symbol interference (ISI) and provides soft decisions for further processing. A single channel response required by the equalizer can be formed by a combination of the convolved CIRs from the JSTOF. This pre-filter can also automatically switch to the conventional or standard filter in the conventional receiver in any AWGN dominant cases and switch back to the JSTOF-based receiver in any interference dominant cases. This auto-switching capability reduces the loss in AWGN dominant cases.

An example of the pre-filter or interference canceling filter for the JSTOF-based and DARP-capable receiver is shown at 10 in FIG. 1, in which the oversampling ratio is 2 and the number of the virtual antennas is 4 (M=4), as also indicated by $X_1(k)$ through $X_4(k)$. Throughout this description the pre-filter 10 can be referred to as the interference canceling filter or JSTOF filter, and acts as a pre-filter in a DARP compliant receiver. A receiver incorporating this filter 10 could be described as a JSTOF receiver as is shown by the dashed line at 11 in FIG. 1.

FIG. 1 shows examples of the various circuit blocks used for the filter 10. An input signal is received into a derotation circuit 12. The derotated output signal is split, with a portion passing into a filter 14 of a conventional receiver that includes a 2:1 switch 16, and an output into a matched filter 18 and a cross-correlation circuit 20 that receives shortened training sequence (TS) symbols. The 2:1 switch 16 is operable to allow switching between the filter 14 and the JSTOF-based and DARP-capable pre-filter 10.

The other portion of the output signal from the derotation circuit 12 is split into even samples and odd samples as part of the virtual antenna 24 and split again into real and imaginary signals to form the respective $X_1(k)$ through $X_4(k)$ input signals into a JSTOF circuit 30, also referred to as a multi-channel, space-time filter circuit. It should be noted that a virtual antenna arrangement need not be used in all embodiments. That is, the filter 18 may be used for filtering signals directly from one or more physical (i.e., real) antennas, such as in a phase shift keying (PSK) application (e.g., 8PSK), for example. The output signals from the JSTOF circuit are passed into a multi-channel matched filter circuit 32, and its output signal is passed into a resealing circuit 34 and then into a multiplexer circuit 36 as data ($d_1$). The multiplexer circuit 36 also receives a channel ($c_1$) response. When the conventional filter 14 is connected, the multiplexer 36 receives the data ($d_2$) and channel ($c_2$) response from the matched filter circuit 18 and cross-correlation circuit 20. Signals are passed into a Viterbi equalizer 38 as a soft decision output.

Figure 2:
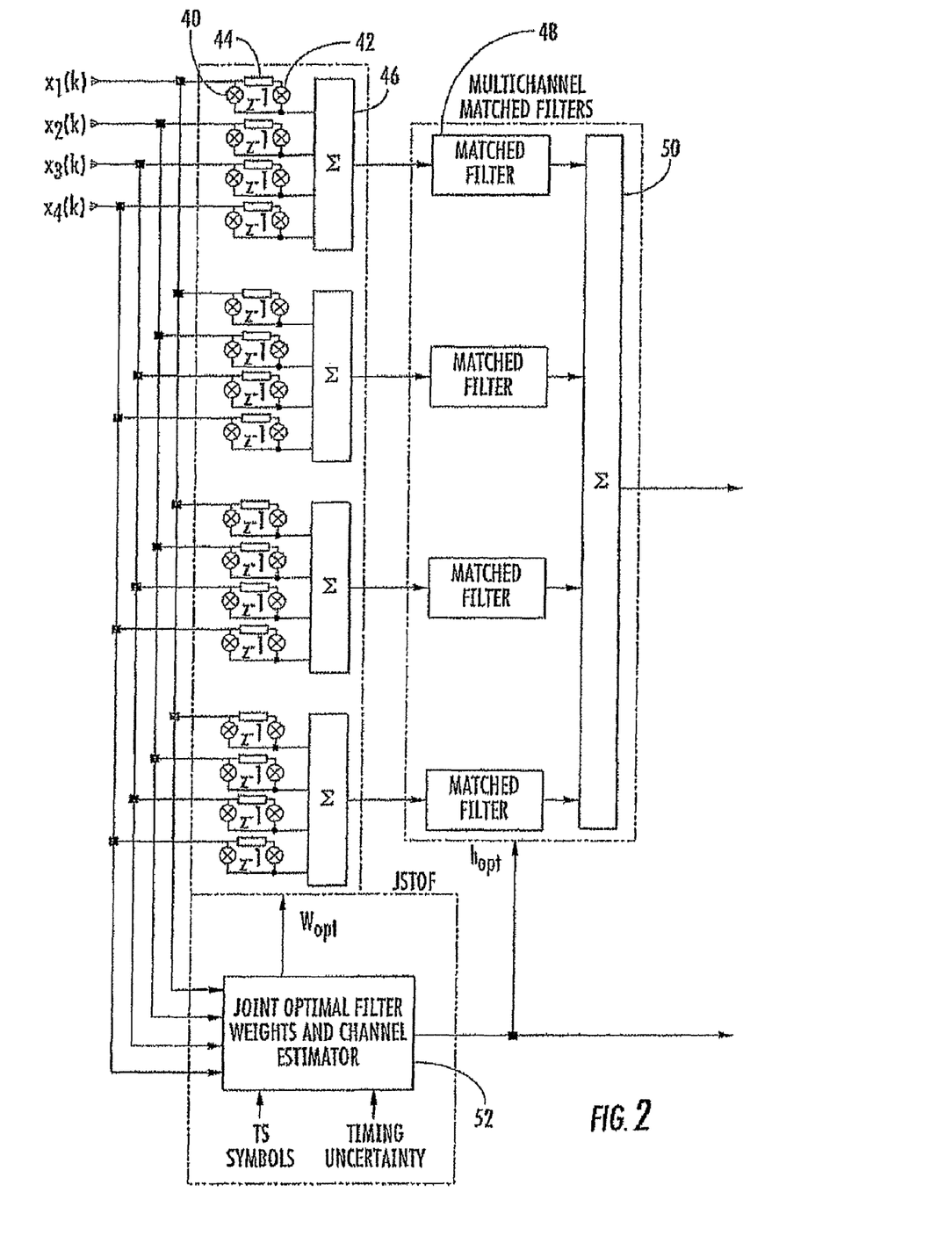
FIG. 2 is a more detailed block diagram of the Joint Space-Time Optimum Filter and Multi-Channel Matched Filters shown in FIG. 1.

Further details of the JSTOF and the multi-channel matched filters are shown in FIG. 2, where the number of time-delayed samples used in the JSTOF circuit is 2 (N=2). The various inputs $X_1(k)$ through $X_4(k)$ are received into the JSTOF, which is shown in greater detail. The JSTOF circuit 30 includes channelized multipliers, also termed mixers 40, 42, delay units 44 and summers 46, which input into multi-channel matched filters 48 for each of the four illustrated channels, and signals from the matched filters are passed into a summer 50. A joint optimal filter weights and channel estimator circuit 52 receives TS symbols and timing uncertainty signals to produce the weights ($W_{OPT}$) used for the mixers 40, 42.

It thus is possible as described to integrate a pre-filter function into a conventional GSM receiver by adding a pre-filter branch parallel to a conventional matched filter as shown in FIG. 1. The conventional software/hardware Viterbi equalizer 38 can be used without change. In one non-limiting example, an integrated DARP-capable receiver has been tested against DARP test cases by simulations, which indicates that the receiver provides 1.6 dB to 6.9 dB margin over a specified performance in terms of the frame error rate (FER) for one of the AMR speech channels.

Figure 2A:
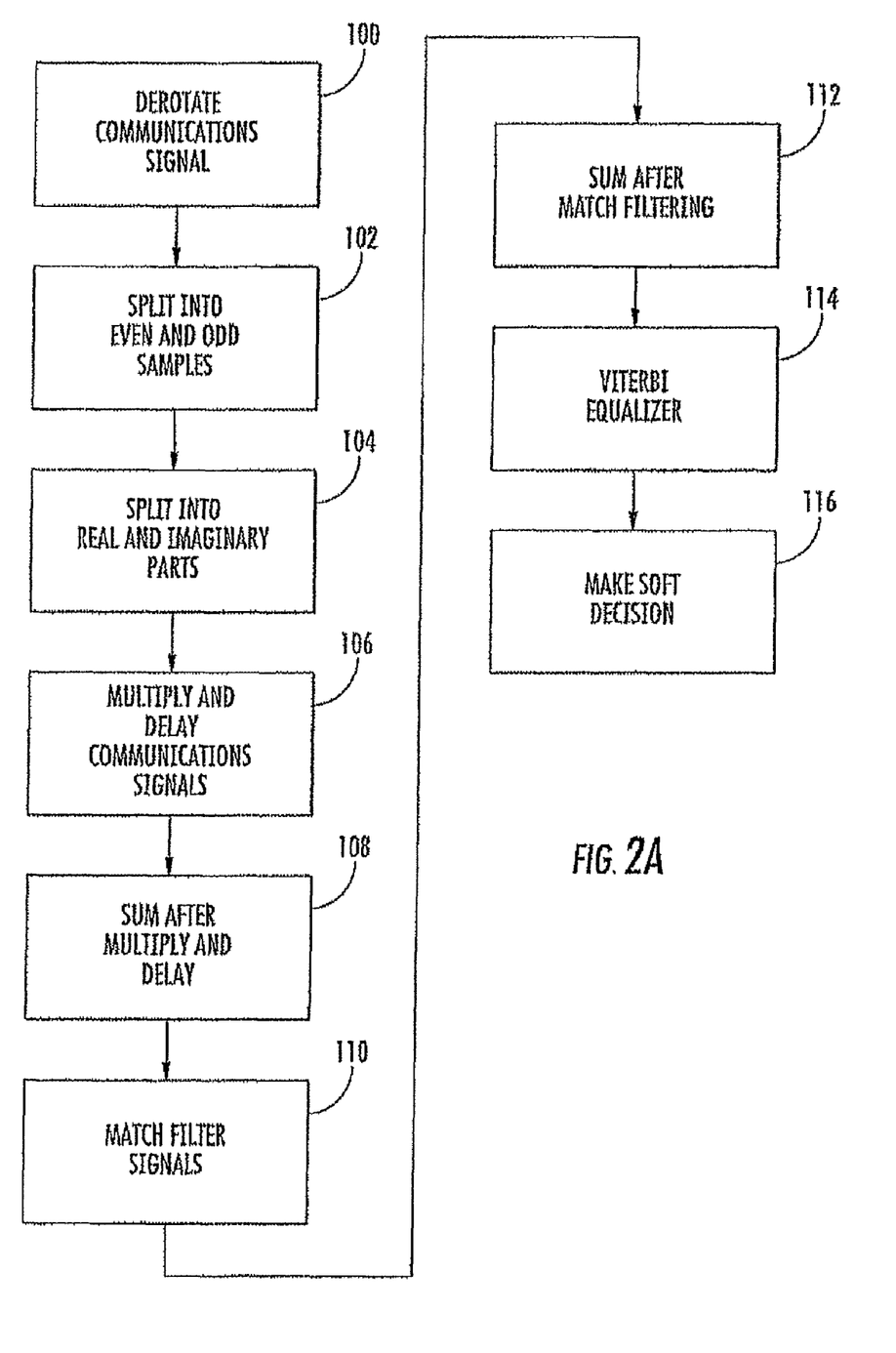
FIG. 2A is a block diagram of a method in accordance with the present invention.

FIG. 2a is a flow chart illustrating a high-level method associated with the described system in which the various steps are shown as non-limiting examples. The various steps begin with the 100 series reference numerals. The incoming communications signal is derotated (Block 100) and passed into the virtual antenna. The communications signal is split into even and odd samples (Block 102), and each even and odd sample is then split into real and imaginary signal parts (Block 104). The communications signals from the virtual antenna are passed into the JSTOF circuit, where the communications signals are multiplied and delayed (Block 106) and then summed (Block 108), all as part of a first multiple-in, multiple-out (MIMO) Joint Space Time Optimum Filter (JSTOF). After summing, summed signals are passed into the multi-channel, multiple-input single-output (MISO) matched filter circuit (Block 110) and then summed (Block 112) and passed as a single out signal into the Virterbi equalizer (Block 114) in which a soft decision is made (Block 116).

In operation, the derotation circuit 12 is operable with GMSK modulated signals and the frequency offset that is part of that signaling protocol. Before any derotation, the signal constellation is dynamic and after derotation the signal constellation becomes static, i.e., any symbols are typically concentrated on 0° and 180°, with symbols rotated to those two points. Thus, the GMSK signal can be treated as a typical binary phase shift keying (BPSK) signal. The derotation at the front end is used for even and odd samplings, which is useful because of the over-sampling rate. For example, in a conventional receiver, this is typically at the rate of 1, i.e., one sample per symbol.

The virtual antenna 24 can increase the sampling rate to two samples per symbol in a serial manner coming from the baseband filter to form two separate channels of even and odd. Before this process, the odd/even samples were serially interleaved. These signals are then further split into the real and imaginary signal parts to form the four independent channels of the virtual antenna. It should be noted that in some embodiments other numbers of virtual antennas/channels may be used (e.g., one or more), as will be appreciated by those skilled in the art.

As best shown in FIG. 2, these signals are then passed into the multiplier 40,42 and unit delay circuits 44, e.g., a one symbol delay, and thus the signal is processed with a multiply and delay, followed by a multiply operation as evident by the two multipliers 40, 42 and one delay circuit 44. This operation is followed by a summation in summer 46 as illustrated. This portion of the system is operable as a multi-channel, two-dimensional filter. One dimension occurs because of the delay in time and another dimension is introduced from the virtual antenna, i.e., a spatial dimension as described and thus the two dimensions form a space-time filter.

It is evident each incoming signal is used in conjunction with other channels, and multipliers receive weights from the Joint Optimal Filter Weights and Channel Estimator 52. The weights coming from the Joint Optimal Filter Weight and Channel Estimator 52 are passed into the multipliers.

The weights are also an 8×4 dimensional matrix in one non-limiting example, i.e., 32 weights. As to the training sequence symbols input into the Joint Optimal Filter Weights and Channel Estimator 52, there are typically in some non-limiting examples about 26 known symbols and it is known which training sequence a packet contains. A +/−3 or seven positions search in a non-limiting example can be used to find the timing. The impulse response of the multi-channel matched filter ($h_{opt}$) can be used such that the system matches the channel response and makes the signal stronger after the matched filter.

As shown in FIG. 1, resealing can occur as a hardware or software convenience, although it is not required. This resealing circuit 34 allows greater operation for a 4-bit or 5-bit input as a non-limiting example to the Viterbi equalizer 38. The dynamic range of the signal can be readjusted such that the signal can be sent into a 4-bit or 5-bit circuit.

As noted before, the multiplexer 36 can take the signals $d_2$ and $c_2$ for the data and channel response from the conventional filter receiver 14 or the signals $d_1$ and $c_1$ for the data and channel response from the JSTOF receiver 10 to allow a switch-over between the two. The JSTOF receiver will introduce some loss if there is no interference, i.e., just pure white noise. In this case the conventional receiver 14 can be used and will work adequately. So, the circuits can switch back to the conventional filter without loss introduced by the JSTOF receiver and its circuits. The switching is based on the estimation of the $SINR_{OUT}$ minus $SINR_{INP}$. If the quantity is below a threshold, the system determines there is little interference and the interference canceling of the JSTOF receiver is not required. Thus, the filter of the conventional receiver 14 is used by switching the 2:1 switch 16.

The circuit is operable in beam forming systems and other systems. This type of system also allows the signal-to-noise ratio to be improved and the bit error rate (BER) to be improved. This could impact top level protocols and phone calls and other communications matters for use with these circuits.

The multi-channel structure of the JSTOF-based filter 10 is used in one embodiment, and the MIMO-based JSTOF circuit 30 provides a space-time filter weight and channel estimations that are different from prior art solutions. This circuit provides the ability to combat the interference efficiently for both synchronous and asynchronous interferences and yield high performance. Some simulations have shown that none of the solutions in some prior art techniques provide the required performance against the DARP test cases.

This MISO-based multi-channel matched filter circuit 32 is a feature that improves the overall error rate performance and reduces the complexity of the equalizer by avoiding multi-channel Viterbi equalizers. The built-in automatic switching between JSTOF-based and conventional receivers reduce the loss in AWGN cases.

Suitable receiver structures can be used in order to meet the DARP requirements. An Interference Canceling Matched Filter (ICMF) can use an example of the virtual antenna as described and beamforming to combat the interference. The circuit is sensitive to the estimation errors of the Channel Impulse Response (CIR) of the desired signal. A Joint Demodulation (JD) showed good performance for the various test cases. In addition to the difficulty in combating the asynchronous interferers, there may be heavy computational complexity involved in finding the CIR of an interferer.

In one embodiment, the virtual antenna 24 is operable with adaptive space-time filtering, allowing the Joint Spatial-Temporal Optimum Filter (JSTOF) circuit 30 to be used. One difference from the ICMF is that the spatial-temporal filter weights used to suppress the interference and the CIR estimation of the desired signal are jointly estimated and optimized in the JSTOF while the two are separately estimated in an ICMF. The JSTOF circuit 30 can be a Multiple-Input-Multiple-Output (MIMO) circuit that takes advantage of the rank deficiency nature of the desired CIR matrix in the space-time setup. Simulations have shown a satisfactory performance for the various DARP test cases. Computational load is deemed acceptable given that fixed-point Cholesky factorization and EVD/SVD are feasible.

This method has some simplicity and low computational complexity. It is also robust because the system makes few assumptions about the source of the interference. In addition, the system can continue to use the existing equalizer structure, as the solution is integrated as a pre-processing step on the input data. This would allow the system to use the HW equalizer accelerators if available.

In order to support the evaluation of this technique, the system level Block Error Rate (BLER) simulator was extended to support all of the interferer models/scenarios being used by the 3GPP DARP Specification.

There now follows a description of the simulation performance for DARP test cases using the JSTOF circuit. It should be understood that space-time processing for joint interference reduction and channel estimation has been used in a base station, where an array of M antennas is available. Assuming that the equivalent channel response for the single desired user can be modeled as an L-tap Finite Impulse Response (FIR) filter, a snapshot sample of the received baseband signal can be expressed as $$x(k) = \sum_{l=0}^{L-1} c(l)s_{k-l} + v(k) = Hs(k) + v(k), \quad (1)$$

where x(k) is an M×1 vector representing the output from the antennas, H is an M×L matrix containing the channel response for the antenna array, s(k) is an L×1 vector for the corresponding symbols transmitted, and v(k) is an M×1 vector including the AWGN and the interference. The space-time extension for formula (1) can be obtained by stacking N time-delayed versions of x(k) into a taller MN×1 vector $\bar{x}(k)$ as follows:

$$\bar{x}(k) = [x^T(k), x^T(k-1), \ldots, x^T(k-N+1)]^T = \overline{H}\bar{s}(k) + \bar{v}(k), \quad (2)$$

where $\overline{H}$ an MN×(L+N−1) matrix is the block Toeplitz version of H and $\bar{s}(k) = [s_k, s_{k-1}, \ldots, s_{k-L-N+2}]^T$. The samples that correspond to the training sequence can be collected, $$\overline{X} = [\bar{x}(k), \bar{x}(k+1), \ldots, \bar{x}(k+p-1)] = \overline{H}\overline{S} + \overline{V}, \quad (3)$$

where p=P−L−N+2, P is the number of symbols of the training sequence, $\bar{x}$ is an MN×p matrix, and $\bar{s} = [\bar{s}(k), \bar{s}(k+1), \bar{s}(k+p-1)]$ is an (L+N−1)×p convolution matrix of the training symbols. The joint optimization is to find a non-trivial. MN×1 weight vector w for a space-time filter and a non-trivial (L+N−1)×1 channel estimation vector h after the filter such that the output interference residual of the filter is minimized, i.e., to solve the following optimization problem:

$$\min_{w,h}\|w^T\overline{X} - h^T\overline{S}\|^2. \quad (4)$$

It can be found that the optimal weight is $$w_{opt} = R_x^{-1}R_{xs}h_{opt}, \quad (5)$$

and the optimal channel estimation $h_{opt}$ is the eigenvector corresponding to the minimum eigenvalue of the matrix $R_S - R_{xs}^H R_x^{-1} R_{xs}$, where $$R_x = \overline{X}*\overline{X}^T, (MN \times MN) \quad (6)$$

$$R_s = \overline{S}*\overline{S}^T, ((L+N-1)\times(L\pm N-1)) \text{ and} \quad (7)$$

$$R_{xs} = \overline{X}*\overline{S}^T, ((MN)\times(L+N-1)). \quad (8)$$

Given that the noise plus interference component $\overline{V}$ in the space-time model of equation (3) is no longer white but approximately Gaussian distributed with unknown covariance matrix $R_v$, the optimal estimation for the channel $\overline{H}$ is the maximum-likelihood (ML) estimation, which is a minimization of the following quantity:

$$l(\overline{H},R_v) = \log|R_v| + \|\overline{X} - \overline{H}\overline{S}\|_{R_v^{-1}}^2, \quad (9)$$

In this non-limiting space-time model, the number of independent channels is always less than or equal to M and $\overline{H}$ is usually rank deficient, i.e., rank($\overline{H}$)=r<min(MN, L+N−1).

The rank deficient ML problem can be used for the rank−1 approximation of the space-time filter.

The JSTOF circuit in one embodiment can use a different approach to find the joint optimum solutions for the filter weight and the channel estimation. It is possible to find the ML estimation of $\overline{H}$. The estimation can be decomposed as $$\hat{H}^* = \hat{H}_s\hat{H}_t^H, \quad (10)$$

where $\hat{H}_s$ (MN×M) is the estimation of the space matrix of $\hat{H}$ and $\hat{H}_t$ ((L+N−1)×M) is the estimation of the time matrix of $\overline{H}$. They can be obtained by:

$$\hat{H}_t = R_s^{1/2}V_{DM}, \text{ and} \quad (11)$$

$$\hat{H}_s = R_{xs}\hat{H}_t, \quad (12)$$

where $R_s = R_s^{1/2}R_s^{H/2}$ is the Cholesky factorization and $V_{DM}$ consists of the M eigenvectors corresponding to the top M eigenvalues of the matrix D, $$D = R_s^{-H/2}R_{xs}^H R_x^{-1} R_{xs}R_s^{-1/2}. \quad (13)$$

In a next step, the optimal weight for the space-time filter can be obtained by $$w_{opt} = R_x^{-1}R_{xs}\hat{H}_t, (MN \times M) \quad (14)$$

and the optimal channel estimation is $$h_{opt} = w_{opt}\cdot\hat{H}. (M\times(L+N-1)) \quad (15)$$

It is then possible to apply the optimal space-time filter in equation (14) to the samples from the antenna array 24. Clearly the outputs of the filter 30 still have M channels, and it is a MIMO system. The optimal channel estimation in equation (15) can be used for the multi-channel matched filters 32. The outputs of the matched filter are then combined (summed up) and rescaled in the rescaling circuit 34 to the modified desired level. The final output is a single-channel sample stream and can be fed into the Viterbi equalizer 38. Note also that the number of channel taps after the JSTOF has been changed to L+N−1 comparing to L of the modeled channel taps before the JSTOF.

It was observed by simulations that the JSTOF receiver incurred more that 1 dB loss in the pure AWGN cases compared to the conventional receiver using the conventional filter. To reduce the loss, a strategy of automatic switching between the JSTOF and conventional receivers was developed. The switching is based on the measurement of the difference of the input and output SINR's of the JSTOF. When the difference is below a predefined threshold the JSTOF receiver is turned off and the conventional receiver is turned on. The input SINR can be easily computed once the estimation of $\overline{H}$ is done in equation (10):

$$SINR_{imp} = \frac{\|\hat{H}\overline{S}\|^2}{\|\overline{X} - \hat{H}\overline{S}\|^2} = \frac{tr(\hat{H}^* R_s \hat{H}^T)}{tr(R_x + \hat{H}^* R_s \hat{H}^T - 2\text{Re}\{w_{opt}^H R_{xs} h_{opt}^T\})}, \quad (16)$$

and the output SINR can be computed from equations (14) and (15):

$$SINR_{out} = \quad (17)$$

$$\frac{\|h_{opt}\overline{S}\|^2}{\|w_{opt}^T\overline{X} - h_{opt}\overline{S}\|^2} = \frac{tr(h_{opt}^* R_s h_{opt}^T)}{tr(w_{opt}^H R_x w + h_{opt}^* R_s h_{opt}^T - 2\text{Re}\{w_{opt}^H R_{xs} h_{opt}^T\})}.$$

On the mobile side, a virtual antenna array can be set up by the combination of oversampling and the separation of the real and imaginary parts as shown in FIG. 1.

In accordance with various embodiments, the joint optimum MIMO space-time filter and channel estimation set forth in equations (14) and (15) enhances interference suppression performance. The MISO multi-channel matched filters 32, which are based on the channel estimation in equation (15), improve the error rate performance while reducing the complexity of the Viterbi equalizer 38. A strategy of automatic switching between JSTOF and conventional receivers reduces the loss in pure AWGN cases.

The JSTOF defined by equations (6)-(17) can be implemented in different ways in terms of numerical stability and computational complexity. The major differences are the way in which the inverse of the autocorrelation matrix $R_x$ is calculated and the way in which the channel $\hat{H}$ is estimated with reduced rank.

One such implementation is a Cholesky decomposition-based matrix inversion of $R_x$ and the eigenvalue decomposition of matrix D in equation (13). Specifically, since $R_x$ is symmetric positive definite, the Cholesky decomposition exists:

$$R_x = L_x L_x^T. \quad (18)$$

D can be rewritten as $$D = D_1 D_1^T, \quad (19)$$

where $$D_1 = L_s^{-T} R_{xs}^T L_x^{-T}. \quad (20)$$

It should be noted that the inverse is actually performed with the square-root of $R_x$, and the explicit computation of the inverse may be avoided by the back-substitution. Also, D is numerically stable because of its structure of mutual cancellations. This was verified by simulations that showed the condition number of D is seldom greater than 300. This implies the eigenvalue decomposition on D would not require unduly sophisticated algorithms for typical applications, as will be appreciated by those skilled in the art. In fact, this approach may potentially have the least computational complexity of the approaches outlined herein.

One potential numerical concern is the Cholesky decomposition on $R_x$, as its condition number may potentially be relatively high, and its positive definite property may be offset to some degree by round-off errors. Simulations showed, however, that the condition number of $R_x$ is less than $10^7$ even in some extreme scenarios such as very high and very low carrier-to-interference (C/I) ratios.

In accordance with an alternate embodiment, the QR decomposition in the sample domain may be used to avoid the direct calculation of the inverse of $R_x$. Since the $\overline{X}^T$ in equation (3) has full column rank, it has the unique QR decomposition $$\overline{X}^T = QR, \quad (21)$$

where Q is a p×MN matrix with orthogonal columns and R is a full rank MN×MN upper triangular matrix. It can be shown that $$R_x^{-1} = R^{-1} R^{-T}, \quad (22)$$

and the D in equation (13) can be written in the form of equation (19) with the $D_1$ re-defined by $$D_1 = L S_s^{-T} S Q. \quad (23)$$

The reduced rank channel estimation may be performed with the eigenvalue decomposition on D as in the previous approach, and the optimum filter weight matrix of (14) can be reduced as $$w_{opt} = R^{-1} D_1^T V_{DM}. \quad (24)$$

This approach is basically an equivalent version of Cholesky decomposition in the sample domain since one can show that $R = L_x^T$. It has improved numerical stability at the expense of the QR decomposition's greater complexity (requiring approximately twice as many operations for a matrix of given size) and larger sample matrix (having approximately 3 times as many rows in an example case where M=4, N=2 and L=5).

The two approaches described above still require the computation of the triangular matrix inverse, although this may be done by back-substitutions. Turning now to yet another alternate approach, i.e., the singular value decomposition (SVD) approach, the matrix inversion may be avoided and the numerical stability may be further improved in some applications. This approach starts with the SVD on the sample matrix in equation (3):

$$\overline{X}^T = U_x \Sigma_x V_x^T, \quad (25)$$

where $U_x$ is a p×MN matrix with orthogonal columns, $V_x$ is an MN×MN orthogonal matrix and $\Sigma_x$ is an MN×MN diagonal matrix, $\Sigma_x = \text{diag}(\sigma_1, \ldots, \sigma_{MN})$, with the singular values on its diagonal. It can be shown that $$R_x^{-1} = V_x \Sigma_x^{-2} V_x^T. \quad (26)$$

The D in equation (13) still has the form of equation (19) with $D_1$ defined by:

$$D_1 = L_x^{-T} S U_x. \quad (27)$$

The channel estimation may be obtained by the SVD on $D_1$ and the filter weight matrix may be written as $$w_{opt} = V_x \Sigma_x^{-1} D_1^T V_{DM}, \quad (28)$$

where $V_{DM}$ contains the top M right singular vectors of $D_1$. The SVD in this approach may require more computations than the Cholesky and QR decompositions used in the previous two approaches.

As a comparison of the three approaches outlined above (i.e., Cholesky, QR, and SVD), the table in FIG. 9 lists the computations step by step for an example where M=4, N=2 and L=5. To find the best timing of the burst, the JSTOF searches a number of timing hypotheses and the one corresponding to the minimum output residual is chosen as the best timing. The output residual is defined by:

$$e = \|w_{opt}^T \overline{X} - h_{opt}^T \overline{S}\|^2, \quad (29)$$

The search process basically repeats the operations listed in the table for each hypothesis, but the input sample matrices from the consecutive timing hypotheses change slightly by appending and deleting a column. The updating and the downdating algorithms are potentially applicable to some of the operations, and the overall computation load may potentially be reduced.

Let $\overline{X}(k)$ represent the sample matrix at time instant k. It may be partitioned from equation (3) to $$\overline{X}(k) = [\overline{x}(k), \tilde{X}(k+1)], \quad (30)$$

where $$\tilde{X}(k+1) = [\overline{x}(k+1), \ldots, \overline{x}(k+p-1)]. \quad (31)$$

The sample matrix at time k+1 may be expressed as $$\overline{X}(k+1) = [\tilde{X}(k+1), \overline{x}(k+p)]. \quad (32)$$

The autocorrelation matrix at time k+1 has the form $$R_x(k+1)=R_x(k)-\bar{x}(k)\bar{x}^T(k)+\bar{x}(k+p)\bar{x}^T(k+p). \tag{33}$$

This is a combination of a rank–1 downdate and a rank–1 update. One hyperbolic rotation-based algorithm for updating/downdating the Cholesky factorization is set forth in Matrix Computations by Golub et al., $3^{rd}$ edition, 1996, which is hereby incorporated herein in its entirety by reference.

Another applicable update/downdate algorithm disclosed in Golub et al. text is for QR decomposition, which is based on the Givens rotation. Of course, the given approach that should be used in a particular application will depend on factors such as available processing resources, computational complexity, etc., as will be appreciated by those skilled in the art. Other approaches may also be used, as will also be appreciated by those skilled in the art.

The performance of the JSTOF based receiver has been evaluated by Matlab simulations using an extended BLER simulation engine. The parameters for the JSTOF based receiver can be set with different aspects. Examples of values follow:

1) The oversampling ratio (OSR) of 2 can be selected, which maps to the number of virtual antennas (M) of 4 in this non-limiting example, and simulation shows that reducing the OSR to 1 causes significant performance degradations;

2) A number of temporal delayed samples (N) can be selected as 2. Increasing the number, however, does not always improve the performance;

3) A reduced rank for the channel response matrix can be selected as M. Increasing or decreasing the rank does not necessarily improve the performance.

4) An auto-switch threshold can be 4.75 dB.

5) A soft decision output can be quantized in 5 bits width. Increasing the width to 8 bits can improve the performance marginally for DTS-5. Soft decision correction can be enabled.

The AMR speech channel, TCH-AFS12.2 can be used to evaluate the performance of the JSTOF in terms of FER. The propagation condition TU50 km/h-1950 MHz can be assumed throughout the simulations. A simulation ran 1000 trials (blocks) for each case.

Figure 3:
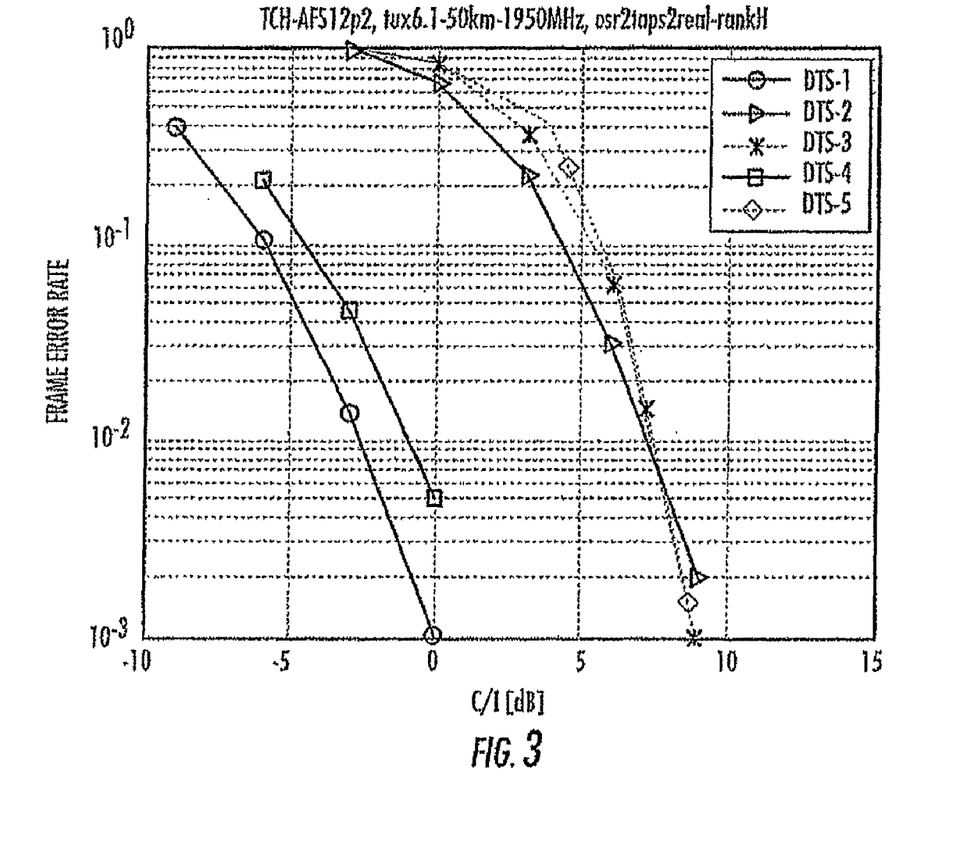
FIG. 3 is a graph showing the Joint Space-Time Optimum Filter based DARP capable receiver performance for various DARP test cases.

The FER's of the receiver, against the carrier-to-interference (C/I) ratio, are shown in the graph of FIG. 3. The margins against the reference performance specified are listed in the table below.

| Test case | JSTOF performance: C/I at FER = 1%, dB | Spec. performance: C/I at FER = 1%, dB | Margin of JSTOF against Spec., dB |
|---|---|---|---|
| DTS-1 | −2.6 | 4 | 6.6 |
| DTS-2 | 7.3 | 9 | 1.7 |
| DTS-3 | 7.6 | 10 | 2.4 |
| DTS-4 | −0.9 | 6 | 6.9 |
| DTS-5 | 7.4 | 9 | 1.6 |

Figure 4:
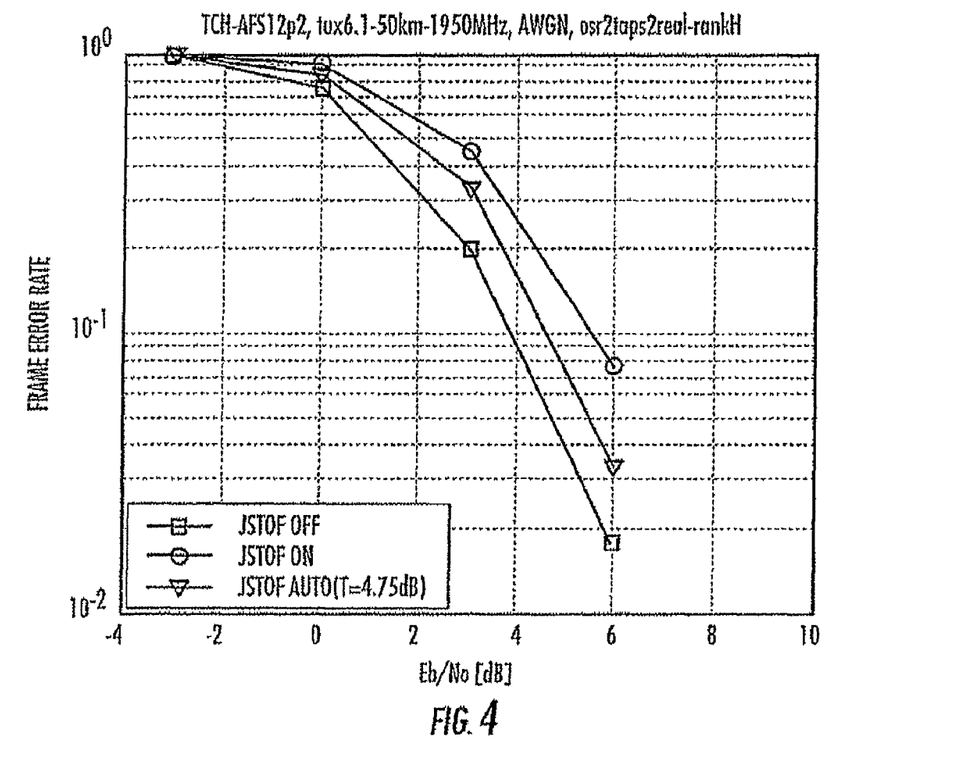
FIG. 4 is a graph showing the Joint Space-Time Optimum Filter receiver performance in accordance with the present invention with additive white Gaussian noise (AWGN), compared with and without an auto-switching strategy.
Figure 5:
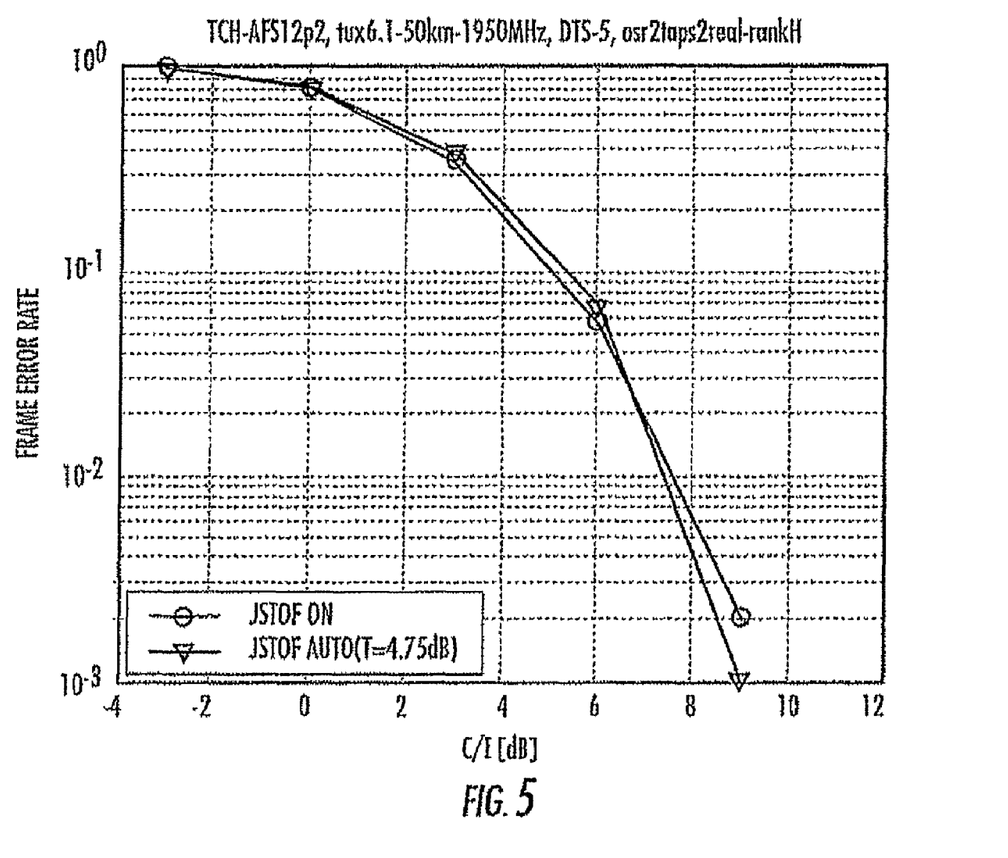
FIG. 5 is a graph showing the Joint Space-Time Optimum Filter receiver performance in accordance with the present invention with DTS-5, compared with and without auto-switching.

The performance of the receiver under pure AWGN and DTS-5 cases with and without the auto-switching strategy is shown in the graphs of FIG. 4 and FIG. 5, respectively. The strategy reduced the loss in AWGN by about 1 dB (at FER=10%) and incurred little loss for DTS-5.

Figure 6:
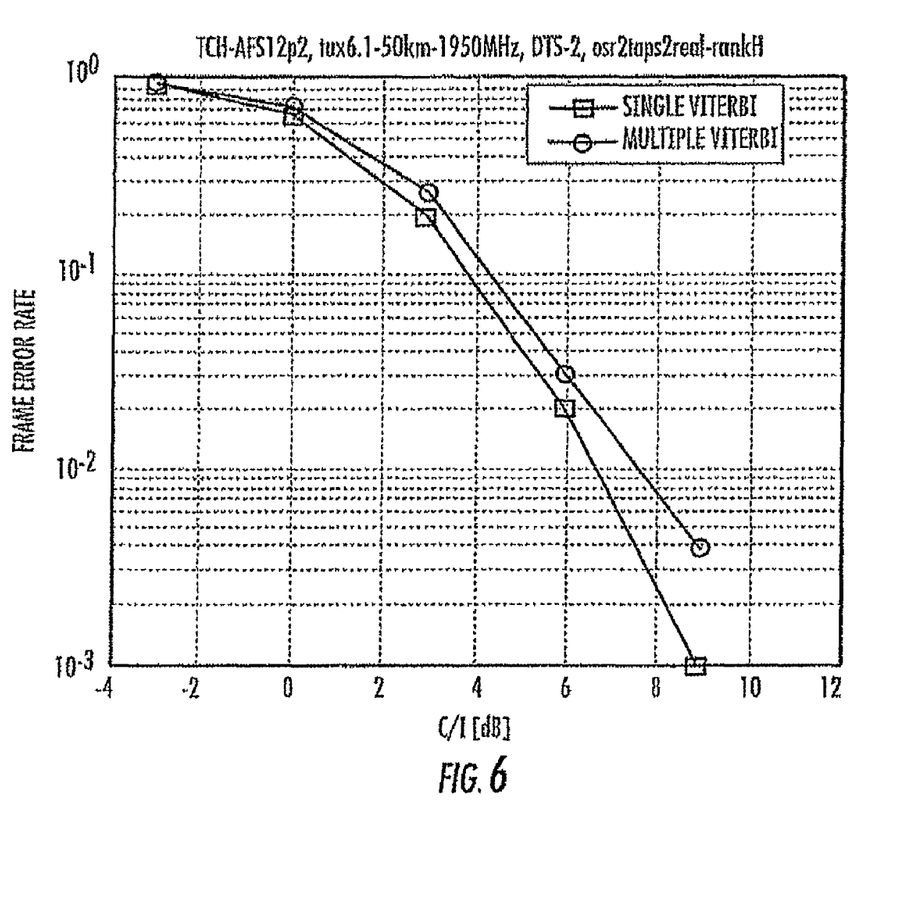
FIG. 6 is a graph comparing the performance of single with multiple Viterbi equalizers in accordance with the present invention, using 8-bit SD limiter in the simulation.

The JSTOF receiver can include multiple Viterbi equalizers, followed by a multi-channel match filter, which combines the soft decisions after the equalizers. A result is shown and compared with the original in the graph of FIG. 6.

Figure 7:
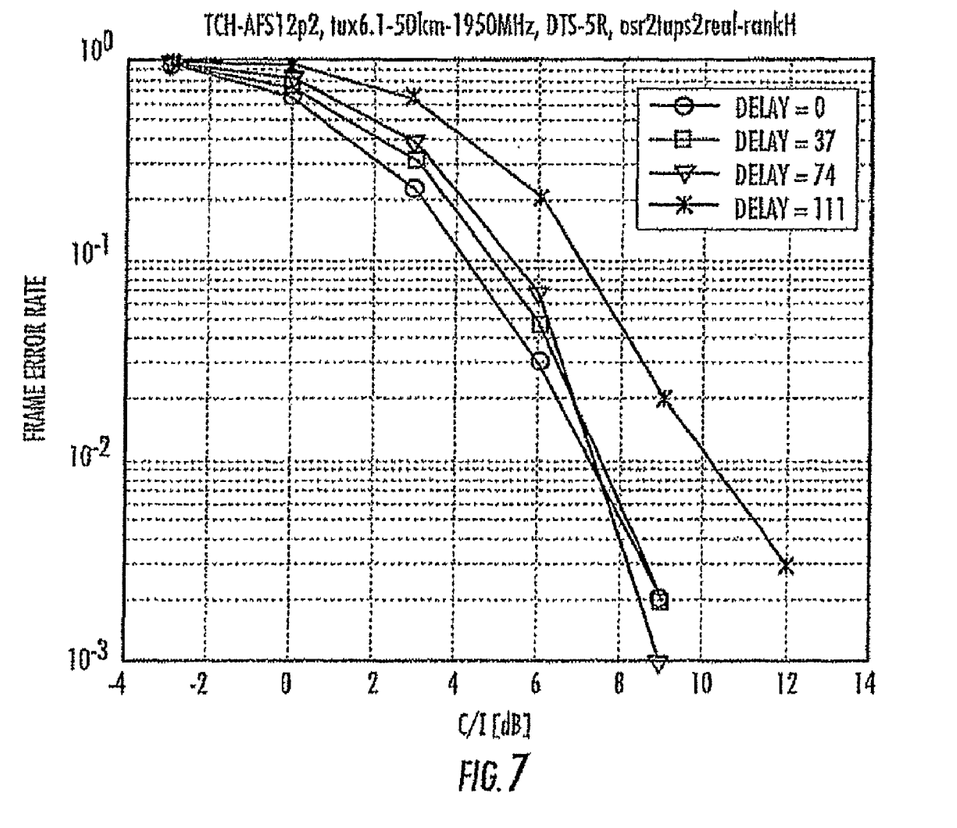
FIG. 7 is a graph showing the performance of Joint Space-Time Optimum Filter Receiver and a modified test case in accordance with the present invention.

Performance can be evaluated with a modified test case DTS-5R, where the delay of the asynchronous interferer can be configured. The performance at 0, ¼, ½ and ¾ of the burst length is shown in the graph of FIG. 7. The results indicate that the performance of JSTOF receiver degrades "slowly" with severe delay of the interferer.

The above-described receiver may advantageously be used in mobile wireless devices (e.g., cellular devices) as well as cellular base stations, for example.

An example of a mobile wireless communications device 1000 that may be used is further described in the example below with reference to FIG. 8. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 8:
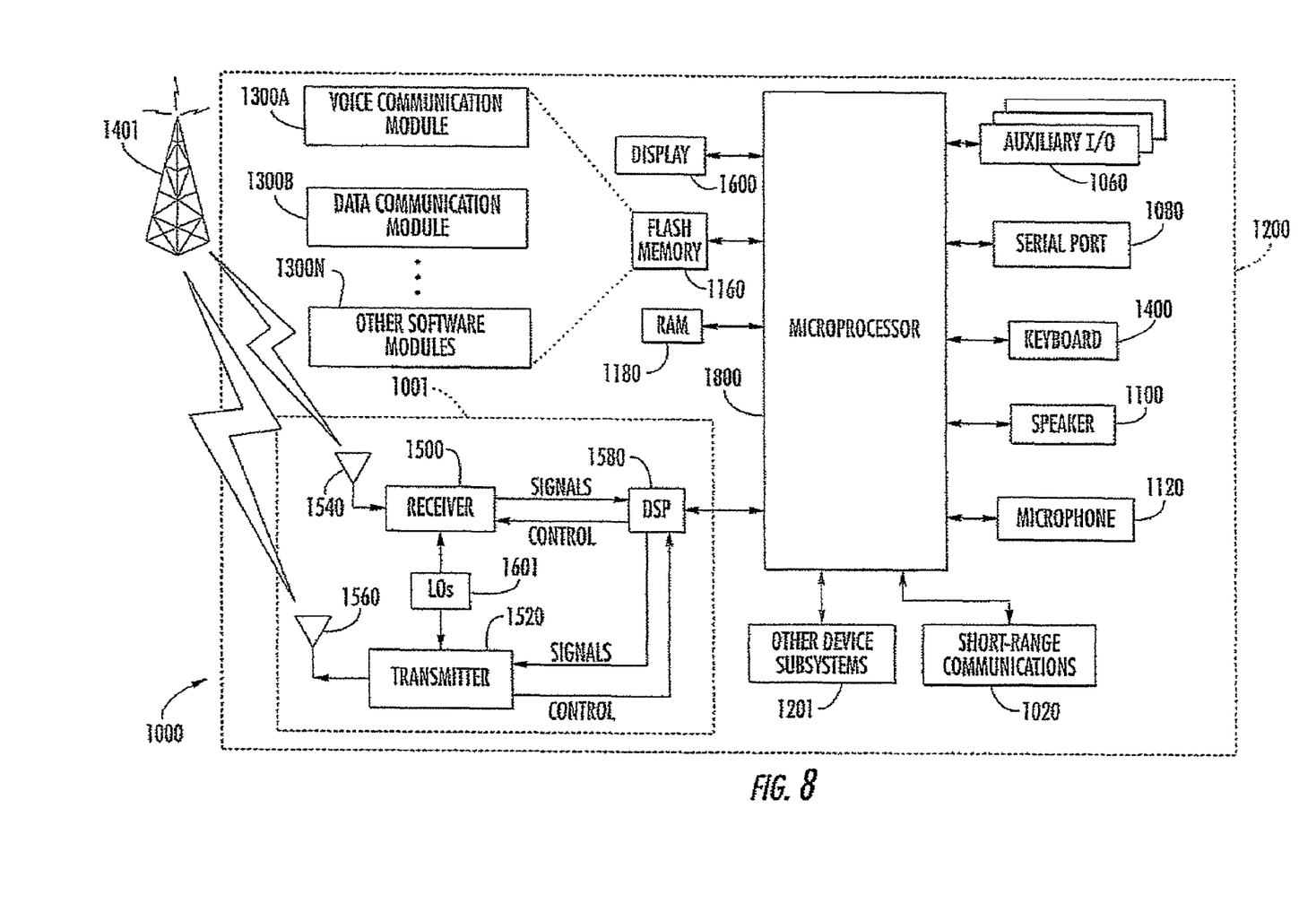
FIG. 8 is a schematic block diagram of an exemplary model wireless communication device that can be used in accordance with one embodiment of the present invention.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the invention.

That which is claimed is:

1. An electronic device comprising:
   a housing;
   a virtual antenna circuit carried by said housing and configured to split a communications signal into odd and even sampled, real and imaginary n signal parts;
   a multi-channel, space-time filter circuit carried by said housing and configured to filter the n signal parts by jointly estimating space-time filter weights and multi-channel impulse responses (CIRs); and
   a multi-channel, matched filter circuit carried by said housing and having a filter response based upon a channel impulse response estimation from said multi-channel, space-time filter circuit.

2. The electronic device according to claim 1 wherein said multi-channel, space-time filter circuit is configured to jointly estimate space-time filter weights and CIRs based upon Cholesky and eigenvalue decompositions.

3. The electronic device according to claim 1 wherein said multi-channel, space-time filter circuit comprises at least one multiplier for multiplying each signal part by a respective space-time filter weight.

4. The electronic device according to claim 1 wherein said multi-channel, space-time filter circuit is configured to jointly estimate space-time filter weights and CIRs based upon a singular value decomposition (SVD).

5. The electronic device according to claim 1 wherein said multi-channel, space-time filter circuit is configured to jointly estimate space-time filter weights and CIRs based upon QR and eigenvalue decompositions.

6. The electronic device according to claim 3 wherein said at least one multiplier comprises a pair thereof connected in parallel; and wherein said multi-channel, space-time filter circuit further comprises a respective delay circuit for each signal part connected to an input of one of said pair of multipliers.

7. The electronic device according to claim 6 wherein the communications signal comprises a plurality of symbols; and wherein each of said multipliers and delay circuits has about a one-symbol delay associated therewith.

8. The electronic device according to claim 6 further comprising a respective summer circuit for each channel for summing outputs of the multipliers.

9. The electronic device according to claim 1 further comprising a joint optimal filter weights and channel estimator configured to receive training sequence symbols and timing uncertainty data and to generate space-time filter weights for said multi-channel, space-time filter circuit and a multi-channel impulse response for said multi-channel matched filter circuit.

10. The electronic device according to claim 1 further comprising an equalizer circuit downstream from said multi-channel, matched filter circuit.

11. An electronic device comprising:
a housing;
a virtual antenna circuit carried by said housing and configured to split a communications signal into odd and even sampled, real and imaginary n signal parts;
a multi-channel, space-time filter circuit carried by said housing and configured to filter the n signal parts by jointly estimating space-time filter weights and multi-channel impulse responses (CIRs);
a multi-channel, matched filter circuit carried by said housing and having a filter response based upon a channel impulse response estimation from said multi-channel, space-time filter circuit; and
an alternative filter carried by said housing and configured to be operative when an interference level is below a predetermined threshold and comprising a matched filter, a cross-correlation circuit, and a switch mechanism for switching the n signal parts into the matched filter and cross-correlation circuits.

12. The electronic device according to claim 11 wherein said multi-channel, space-time filter circuit is configured to jointly estimate space-time filter weights and CIRs based upon Cholesky and eigenvalue decompositions.

13. The electronic device according to claim 11 wherein said multi-channel, space-time filter circuit comprises at least one multiplier for multiplying each signal part by a respective space-time filter weight.

14. The electronic device according to claim 11 wherein said multi-channel, space-time filter circuit is configured to jointly estimate space-time filter weights and CIRs based upon a singular value decomposition (SVD).

15. The electronic device according to claim 11 wherein said multi-channel, space-time filter circuit is configured to jointly estimate space-time filter weights and CIRs based upon QR and eigenvalue decompositions.

16. The electronic device according to claim 13 wherein said at least one multiplier comprises a pair thereof connected in parallel; and wherein said multi-channel, space-time filter circuit further comprises a respective delay circuit for each signal part connected to an input of one of said pair of multipliers.

17. The electronic device according to claim 16 wherein the communications signal comprises a plurality of symbols; and wherein each of said multipliers and delay circuits has about a one-symbol delay associated therewith.

18. The electronic device according to claim 16 further comprising a respective summer circuit for each channel for summing outputs of the multipliers.

19. The electronic device according to claim 11 further comprising a joint optimal filter weights and channel estimator configured to receive training sequence symbols and timing uncertainty data and to generate space-time filter weights for said multi-channel, space-time filter circuit and a multi-channel impulse response for said multi-channel matched filter circuit.

20. The electronic device according to claim 11 further comprising an equalizer circuit downstream from said multi-channel, matched filter circuit.

21. A method of communications reception comprising:
using a virtual antenna for splitting a communications signal into odd and even sampled, real and imaginary n signal parts;
filtering the n signal parts within a multi-channel, space-time filter circuit and jointly estimating space-time filter weights and multi-channel channel impulse responses (CIRs);
receiving multi-channel signals from the space-time filter circuit within a multi-channel matched filter circuit having a filter response based upon a channel impulse response estimation from the multi-channel, space-time filter circuit; and
equalizing an output of the multi-channel, matched filter circuit.

22. The method according to claim 21 wherein jointly estimating the multi-channel, space-time filter weights and CIRs comprises jointly estimating the space-time filter weights and CIRs based upon Cholesky and eigenvalue decompositions.

23. The method according to claim 21 wherein jointly estimating the multi-channel, space-time filter weights and CIRs comprises jointly estimating the space-time filter weights and CIRs based upon a singular value decomposition (SVD).

24. The method according to claim 21 wherein jointly estimating the multi-channel, space-time filter weights and CIRs comprises jointly estimating the space-time filter weights and CIRs based upon QR and eigenvalue decompositions.

25. The method according to claim 21 further comprising summing outputs of the multi-channel, matched filter and rescaling to a desired level.

26. The method according to claim 21 further comprising filtering the n-signal parts within an alternative filter when an interference level is below a threshold.

27. The method according to claim 21 further comprising multiplying each signal part based on space-time filter weights.

28. The method according to claim 27 further comprising summing the signal parts for each channel after multiplying.

* * * * *